United States Patent Office 3,046,141 Patented July 24, 1962

3,046,141

PROCESS OF DYEING ORANGES

Robert Sidney Long, Bound Brook, N.J., assignor, by mesne assignments, to FMC Corporation, San Jose, Calif., a corporation of Delaware No Drawing. Continuation of application Ser. No. 492,059, Mar. 4, 1955. This application Jan. 16, 1962, Ser. No. 165,072
5 Claims. (Cl. 99—148)

This invention relates to the coloration of oranges. This application is a continuation of copending application, Serial No. 492,059, filed March 4, 1955, which is a continuation-in-part of application, Serial Number 415,420, filed March 10, 1954, now abandoned.

For many years it has been customary to color oranges for enhanced varietal orange to red shades. For this purpose there has been used a certified dyestuff F.D. and C. Red 32 which is a mixture of monoazo dyes derived from a mixture of ortho, meta, and para xylidines containing the meta isomer in amounts up to 30%. The mixed xylidines are diazotized and coupled to beta-naphthol. The formerly used color, which will be referred to more briefly herein as Red 32, has a serious disadvantage in that it is by no means harmless. While its toxicity is not high, it is substantial when large amounts of the dyestuff are administered. In fact, it has been decertified as a food color by the Food and drug Administration of the U.S. Government Federal Register, November 16, 1955, pages 8493–8495. By present standards Red 32 is too toxic to be acceptable for coloring oranges.

This invention relates to an improved process of coloring the outer peel and depends on the use of a dyestuff of the formula:

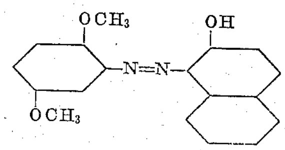

named 1-(2,5-dimethoxyphenylazo)-2-naphthol.

The dyestuff used in the present invention is characterized by sunfastness, by extraordinarily low toxicity, far lower than that of Red 32, and has shown excellent affinity for the outer peel of oranges, which present dyeing problems.

The dyestuff used in the present invention is characterized by its superior tinctorial strength and by its bathochromicity. It excels the dyes of the prior art used for the dyeing of oranges, in these qualities. The visible spectrum curve of the dyestuff used in the present invention demonstrates its bathochromicity in contrast to the visible spectrum curve of Red 32 which is more hypsochromic. The curve of the dyestuff used in the present invention shows a shift away from the curve of Red 32 toward the longer wave lengths which are characteristic of bluer shades. This change toward longer wave length is in the direction of fuller, more natural varietal shades for oranges.

It is an advantage that the lack of toxicity of the dyestuff used in the present invention is not offset by any difficulty in applying it to the coloring of oranges. The normal procedures used with Red 32 may be employed and it is not necessary for the user to learn new techniques of application. Thus, the dyestuff used in the present invention is applied to the outer skin or peel of oranges (as disclosed in U.S. Patents No. 2,068,081 to Sharma and No. 2,324,407 to Longfield-Smith with respect to Red 32) by dipping the fruit in a dye bath comprising a colloidal suspension or solution of the dye in an aqueous medium sometimes containing a wetting or dispersing agent and/or a solvent for the water-insoluble dye; by spraying such a bath on the fruit; or in any other suitable manner, such as by incorporating the dye compound in a waxy carrier applied to the oranges by rubbing and polishing.

The invention will be described in greater detail in conjunction with the following example, the parts being by weight unless otherwise specified.

EXAMPLE 1

A dye emulsion is prepared by dissolving 5 parts of 1-(2,5-dimethoxyphenylazo)-2-naphthol having the formula:

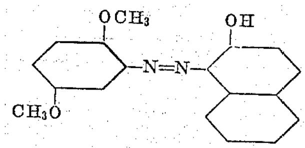

in 50 parts by volume of a mixture of a substantially water-immiscible solvent containing 25 parts by volume of a liquid hydrocarbon solvent of B.P. range 190–260° C. containing about 80% aromatic hydrocarbons, and 25 parts by volume of terpineol and adding this solution to 590 parts by volume of 5.5% sodium oleate solution at 38° C. To 500 parts by volume of water is added 10 parts by volume of the dye solution and the resultant dispersion bath warmed to 50° C. The dispersion bath thus comprises an oil-in-water emulsion, wherein the dye solution forms the oil phase.

A valencia orange dyed in this bath has a substantially uniform, non-removable varietal color.

*Toxicity comparisons*

The toxicity of the dyestuff used in the present invention was determined and compared with that of Red 32 by acute and chronic toxicity tests on albino mice. In each test 10 mice were used and in the chronic tests a control sample of 10 mice were given the same food without dyestuffs. Because of the small size of the test animal, acute toxicity tests involving intraperitoneal injection present a possibility of accidental injury to an occasional mouse, thus the experimental error of such tests is approximately 10%, or 1 mouse in a sample of 10.

Acute toxicity was determined by intraperitoneal injection at two levels, 1024 and 2048 mg./kg. The following table shows the results in terms of the number of deaths per 10 animals:

| Dyestuff | 1024 mg./kg. | 2048 mg./kg. |
|---|---|---|
| 1-(2,5-dimethoxy phenylazo)-2-naphthol | 0/10 | 0/10 |
| Red 32 | 1/10 | 9/10 |

It will be noted that within the experimental error the dyestuff of this invention showed no acute toxicity even at the higher level. Red 32 showed a very high toxicity at the higher level, 90% mortality.

Chronic toxicity was shown by feeding tests of albino mice for 14 days with various concentrations of dyestuff. As a chronic toxicity test, even for 14 days, may not give a complete picture by taking mouse mortality alone, the average gain or loss in weight should be considered because if there is a drastic loss in weight, this can indicate toxicity even though some of the mice have not yet died. The first test was made with feeding rates of 0.5 and 1.0% of dyestuff in the food. The results are shown in the following table:

| Dyestuff | Rate of Deaths (body wt. changes in parenthesis) | |
|---|---|---|
| | 0.5% dye in diet | 1.0% dye in diet |
| 1-(2,5-dimethoxyphenylazo)-2-naphthol | 0/10 | 0/10 |
| Red 32 | 9/10 (−25%) | 10/10 |

It will be noticed that in the case of the first dyestuff there was no mortality at either feeding rate. With Red 32 at the lower rate, 90% of the mice were dead and the average loss of weight was 25%, indicating that even the surviving mouse was a very sick, if not actually a moribund animal. At the higher rate, mortality was 100%. Since there was no mortality even at the higher rate with the first dyestuff, further tests were made by feeding two other series of albino mice with a diet to which 2% and 5% of the first dyestuff was added. At the end of 28 days there was no mortality even among the mice that received 5% of the dyestuff in the diet.

I claim:

1. In the process of coloring the outer peel of oranges, the improvement which comprises applying externally to an orange a dyestuff having the formula:

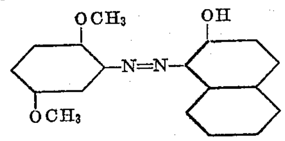

2. The process of claim 1, wherein the dyestuff is dispersed in an aqueous medium and wherein the resulting dispersion is applied to the orange.

3. The process of claim 1, including the steps of preparing a solution of the dyestuff in a substantially water-immiscible solvent for said dye, dispersing a minor proportion of said dye solution in an aqueous medium, and thereafter contacting oranges with said aqueous dispersion to color the outer peel thereof.

4. The process of claim 1, wherein an oil-in-water emulsion is applied to said orange, the oil phase of said emulsion being constituted of said dyestuff dissolved in a substantially water-immiscible solvent.

5. The process of claim 4, wherein said solvent comprises a mixture of an aromatic hydrocarbon and terpineol.

References Cited in the file of this patent

UNITED STATES PATENTS

| | | |
|---|---|---|
| 2,068,081 | Sharma | Jan. 19, 1937 |
| 2,133,404 | Sharma | Oct. 18, 1938 |
| 2,224,904 | Elley et al. | Dec. 17, 1940 |
| 2,324,407 | Longfield-Smith | July 13, 1943 |

OTHER REFERENCES

"Uses and Applications of Chemicals and Related Materials," by Gregory, Reinhold Publishing Corporation, 330 West Forty-Second Street, New York, N.Y., pages 589–590.